(12) United States Patent
Ehrenberg et al.

(10) Patent No.: US 12,311,649 B2
(45) Date of Patent: May 27, 2025

(54) GEOMATERIAL WEB WITH BIOLOGICAL DEGRADATION PROPERTIES

(71) Applicant: Naue GmbH & Co. KG, Espelkamp-Fiestel (DE)

(72) Inventors: Henning Ehrenberg, Lübbecke (DE); Lars Vollmert, Osnabrück (DE); Helge Hoyme, Hannover (DE); Norbert Vissing, Warendorf (DE); Martin Tazl, Hannover (DE)

(73) Assignee: NAUE GMBH & CO. KG, Espelkamp-Fiestel (DE)

( * ) Notice: Subject to any disclaimer, the term of this patent is extended or adjusted under 35 U.S.C. 154(b) by 296 days.

(21) Appl. No.: 17/439,013

(22) PCT Filed: Mar. 2, 2020

(86) PCT No.: PCT/EP2020/055476
§ 371 (c)(1),
(2) Date: Sep. 14, 2021

(87) PCT Pub. No.: WO2020/187552
PCT Pub. Date: Sep. 24, 2020

(65) Prior Publication Data
US 2022/0143951 A1 May 12, 2022

(30) Foreign Application Priority Data
Mar. 15, 2019 (EP) .................... 19163235

(51) Int. Cl.
*B32B 5/14* (2006.01)
*B01D 39/08* (2006.01)
(Continued)

(52) U.S. Cl.
CPC .............. *B32B 5/14* (2013.01); *B01D 39/083* (2013.01); *B01D 39/1623* (2013.01);
(Continued)

(58) Field of Classification Search
CPC ........... B32B 5/14; B32B 3/266; B32B 5/022; B32B 5/024; B32B 5/026; B32B 5/26;
(Continued)

(56) References Cited

U.S. PATENT DOCUMENTS

| 6,242,062 B1 | 6/2001 | de Vries |
| 2009/0317583 A1 | 12/2009 | Naumann |

(Continued)

FOREIGN PATENT DOCUMENTS

| CN | 102076913 | 5/2011 |
| CN | 108795001 | 11/2018 |

(Continued)

OTHER PUBLICATIONS

ISO 16929:2002—Plastics—Determination of the degree of disintegration of plastic materials under defined composting conditions in a pilot-scale test https://www.iso.org/standard/30508.html[Jan. 11, 2024 3:34:35 PM] (Year: 2002).*

(Continued)

*Primary Examiner* — Janine M Kreck
(74) *Attorney, Agent, or Firm* — PRICE HENEVELD LLP

(57) ABSTRACT

A geomaterial web includes a first organic structural material and a second structural material that is different from the first structural material, which is bonded together with the first structural material to form a sheet-like composite material web extending in two mutually perpendicular directions. The first structural material and the second structural material are organic materials, where the first structural material has a first biodegradability and the second structural material has a second biodegradability that is different from the first biodegradability. The second biodegradability may be less than the first biodegradability.

13 Claims, 4 Drawing Sheets

(51) Int. Cl.
   *B01D 39/16* (2006.01)
   *B32B 3/26* (2006.01)
   *B32B 5/02* (2006.01)
   *B32B 5/26* (2006.01)
   *B32B 7/02* (2019.01)
   *B32B 7/022* (2019.01)
   *B32B 7/09* (2019.01)
   *D04H 1/4374* (2012.01)
   *E01F 7/02* (2006.01)
   *E02B 3/12* (2006.01)
   *E02D 3/00* (2006.01)
   *E02D 17/20* (2006.01)

(52) U.S. Cl.
   CPC .............. *B32B 3/266* (2013.01); *B32B 5/022* (2013.01); *B32B 5/024* (2013.01); *B32B 5/026* (2013.01); *B32B 5/26* (2013.01); *B32B 7/02* (2013.01); *B32B 7/022* (2019.01); *B32B 7/09* (2019.01); *D04H 1/4374* (2013.01); *E02B 3/122* (2013.01); *E02B 3/126* (2013.01); *E02D 3/005* (2013.01); *E02D 17/202* (2013.01); *B01D 2239/0266* (2013.01); *B01D 2239/0609* (2013.01); *B01D 2239/0613* (2013.01); *B01D 2239/0618* (2013.01); *B01D 2239/065* (2013.01); *B32B 2262/04* (2013.01); *B32B 2307/7163* (2013.01); *E01F 7/02* (2013.01); *E02D 2300/0087* (2013.01); *E02D 2300/0089* (2013.01); *E02D 2300/009* (2013.01)

(58) Field of Classification Search
   CPC .. B32B 7/02; B32B 7/022; B32B 7/09; B32B 2262/04; B32B 2307/7163; B32B 2307/50; B32B 5/02; B32B 7/04; B01D 39/083; B01D 39/1623; B01D 2239/0266; B01D 2239/0609; B01D 2239/0613; B01D 2239/0618; B01D 2239/065; D04H 1/4374; E02B 3/122; E02B 3/126; E02D 3/005; E02D 17/202; E02D 2300/0087; E02D 2300/0089; E02D 2300/009; E02D 17/00; E01F 7/02
   See application file for complete search history.

(56) References Cited

U.S. PATENT DOCUMENTS

2013/0344759 A1    12/2013  Roure
2014/0302735 A1*   10/2014  Donovan .............. E02D 31/004
                                                         156/332
2017/0081808 A1     3/2017  Lee et al.
2017/0284051 A1*   10/2017  Dragan .................. B32B 27/32

FOREIGN PATENT DOCUMENTS

| DE | 29516797 | 12/1995 |
|---|---|---|
| DE | 202017107116 | 1/2018 |
| EP | 2439342 | 4/2012 |
| EP | 3385426 | 10/2018 |
| EP | 3660095 | 6/2020 |
| JP | 2007217973 | 8/2007 |
| JP | 2015200107 | 11/2015 |
| KR | 20110098188 | 9/2011 |
| WO | 2005023955 | 3/2005 |

OTHER PUBLICATIONS

Thompson Scientific, XP002793991, vol. 2007, No. 58, AN 2007-609906, London, GB (WPI 2017).
Thompson Scientific, XP002793992, vol. 2015, No. 78, AN 2015-701490, London, GB (WPI 2017).
Institut Fur Normung, Kunststoffe—Bestimmung des Zersetzungsgrades von Kunststoffmaterialien unter festgelegten Bedingungen der Kompostierung mittels einer Technikums-Maßstab-Prüfung (ISO/DIS 16929:2018) (Apr. 2018).

* cited by examiner

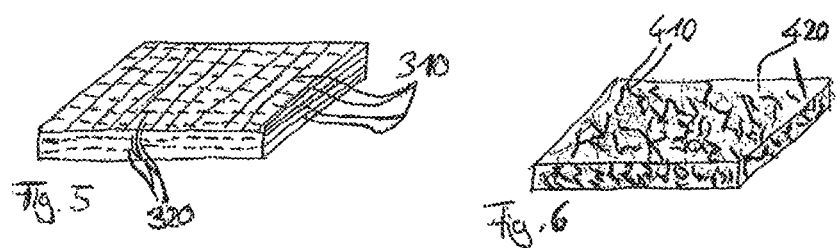

GEOMATERIAL WEB WITH BIOLOGICAL DEGRADATION PROPERTIES

CROSS-REFERENCE TO FOREIGN PRIORITY APPLICATION

The present application claims the benefit under 35 U.S.C. §§ 119(b), 119(e), 120, and/or 365(c) of PCT/EP2020/055476 filed Mar. 2, 2020, which claims priority to Application EP 19163235.5 filed Mar. 15, 2019.

FIELD OF THE INVENTION

The invention relates to a geomaterial web, a method for soil stabilization by means of a geomaterial web, and a use of a geomaterial web for soil stabilization.

BACKGROUND OF THE INVENTION

Geomaterial webs, also called geotextiles (or classically geosynthetics), are used in a variety of ways to stabilize soil layers. Such different applications of geomaterial webs include embankment stabilization, dike construction, bank protection on rivers and lakes, stabilization of embankments in landfills, and stabilization of roadways and railroad construction as typical examples. Geomaterial webs are usually installed at a predetermined depth, i.e., covered by soil layers, but in individual cases, it can also be installed on the surface.

The geomaterial web takes on the task of stabilizing the soil layer and layer boundaries between soils, i.e., preventing erosion or soil redistribution and mixing, preventing or reducing soil material displacement, such as through flow-induced erosion and re-deposition of soil material, and preventing overall slippage of soil layers. Geomaterial webs can be used as a permanent solution in this regard, especially where natural processes such as root penetration or other soil consolidation mechanisms cannot stabilize the soil layer or layer boundaries. In many applications, geomaterial webs are used to provide a temporary mechanical stabilization effect that stabilizes the soil layer to the point where plant growth can be achieved and additional stabilization of the soil layer can be achieved in the long term through root penetration by these growing plants. A geomaterial web in application as a reinforcement mat is known from EP 2 439 342 A1.

One problem associated with such geomaterial webs is that the material introduced into the soil poses a potential environmental risk, with this environmental risk occurring at the installation site itself or at other locations, in case mechanical impacts or other effects cause the geomaterial web to break into smaller sections that travel away from the installation site. To overcome these disadvantages, it has generally been proposed to produce geomaterial webs from biodegradable materials. For example, from DE 29516797 U1 a cover layer made of a material is known, where the material can be natural fiber. From US 2013/0344759 A1 a geotextile with a non-woven structure is known, for the production of which plant fibers are used. For this purpose, as a substitute for known jute or coconut fibers, hemp fibers are proposed.

A fiber structure material designed for increased water absorption capacity is known from EP 3385426 A1. The fiber structure of this known material is designed as a three-dimensional fiber skeleton of interconnected thick and thin fiber sections, which is fabricated from a lyocell solution. This fiber structure material has the disadvantage of having uniform biodegradability due to the three-dimensional direct connection among the fiber portions, and, therefore, does not comprise two structure materials with different biodegradability.

A textile sealing membrane made of lyocell fibers is known from US 2009/0317583 A1. This sealing membrane does not have two structural materials with different biodegradability.

However, a disadvantage of the proposed biodegradable geotextiles is that the desired mechanical soil stabilization is not ensured for the required period in many applications, the mechanical protective effect is lost due to biodegradation, and undesirable soil movements such as slope slides, dike damage and the like may occur. Although a fiber coating is proposed to avoid these problems, this runs counter to the actual goal of achieving biodegradability and creates an environmental risk originating from the coating. The use of biodegradable geotextiles made of the above-mentioned, pre-known natural fibers, therefore, cannot provide satisfactory results in many applications or fails with regard to the time requirements for the mechanical stabilization effect. For geosynthetics, DIN EN 12225, therefore, specifies test criteria to demonstrate general resistance to microbial degradation.

It is, therefore, an object of the invention to propose a geomaterial web, a method for stabilizing soil layers with a geomaterial web, and uses of geomaterial webs for stabilizing soil layers that ensure reliable mechanical stabilization over the necessary period of use, yet reducing environmental pollution.

SUMMARY OF THE INVENTION

According to a first aspect of the invention, this object is solved by a geomaterial strip comprising a first organic structural material and a second structural material that is different from the first structural material, and which is bonded to the first structural material to form a sheet-like composite material web extending in two mutually perpendicular directions, wherein the first structural material and the second structural material are organic materials, the first structural material has a first biodegradability to the extent that in a composting test with the following parameters:
  samples with a length of 10 cm, a width of 10 cm and an original material thickness
  50° C.+/−5° C.
  thermophilic conditions according to ISO 16929
  sieving of solids after six months in a sieve with 2 mm mesh (mesh 8.75)
  when sieving, less than 80 wt. %, in particular less than 50 wt. %, less than 25 wt. % or less than 10 wt. % dry matter of the dry matter of the starting material remains in the sieve, or
in a marine incubation test, with the following parameters:
  samples with a length of 2 cm, a width of 2 cm and an original material thickness
  30° C.+/−2° C.
  aerobic conditions in seawater with a salinity of 3.5 wt. %+/−1 wt. %.
  sieving of solids after 4, 8 and 12 weeks in a sieve with 2 mm mesh (mesh 8.75)
  when sieving after twelve weeks, less than 80 wt. %, in particular less than 50 wt. %, less than 25 wt. % or less than 10 wt. % dry matter of the dry matter of the starting material remains in the sieve, and the second structural material has a second biodegradability, which is different from the first biodegradability, in particular lower than the first biodegradability.

According to the invention, a geomaterial web is proposed which comprises or includes such first structural material and second structural material. The first and second structural materials are bonded together to form a composite sheet material web, that is, a geotextile, mat, or the like. This bonding may be accomplished by weaving, knitting, non-woven processing, or other methods systematically bonding the first and second structural materials together. Preferably, the first and second structural materials may be fibrous materials, that is to be understood to include short fibers, long fibers, yarns, continuous fibers, and the like. The interconnection between the first and second structural materials may also be in the manner of a non-woven material, in that random alignment of fibers is used to achieve entanglement and hooking effects of the fibers with respect to each other.

According to the invention, the first structural material is an organic structural material, for example wood, wood-based materials or plastics. The second structural material can be either an organic or an inorganic material. The functionality and effect of the geomaterial web is achieved by the interaction of the two structural materials.

Both the first and the second structural material exhibit biodegradability. In accordance with the invention, biodegradability is defined according to the principle of ISO Standard DIN EN ISO 16929:2018-04 as published in 2018 (herein referred to as "the ISO 16929 standard" or "ISO 16929:2018-014") or according to a marine degradation test developed by TÜV Austria Belgium. The material according to the invention must meet at least one of these two conditions, preferably both.

According to ISO16929, a material is proven to be compostable if it meets three criteria. One of these criteria is defined in such a way that after 84 days in a controlled composting process, no more than 10 wt. % of the material remains in a sieve of 2 mm when the material or its components are sieved. Inspired by this system and adapted to the needs of geomaterials, the first structural material exhibits a first biodegradability in which within six months in controlled composting according to ISO 16929 under thermophilic composting conditions no more than 50 wt. % of the dry mass of the first structural material remains in the sieve after sieving through a 2 mm sieve. Therefore, the first material does not necessarily qualify as compostable as defined in ISO 16929. However, it may be compostable or it may reach degradation of the 90 wt. % particles<2 mm over a period longer than six months.

The degradation test under marine conditions simulates the degradation of standardized samples under an accelerated simulation in seawater. Here, too, the degree of degradation is determined by a final sieving based on the dry weight remaining in the sieve. However, the more vigorous mobility of the material is simulated by two intermediate sievings after four and eight weeks.

Both degradation tests are performed with specimens of defined dimensions. Length and width are defined, and the thickness is based on the original material, i.e., the thickness of the material in the produced design. In case of layered composites in which the first and second structural materials are arranged and bonded to each other in separate layers lying on top of each other, this can be the thickness of the material in the respective layer. If the original material is produced as a composite layer, such as a fleece or a layer made from two different woven, knitted, or otherwise bonded fibers, then for the purposes of the degradation test, a sample of the material in the original thickness of the layer produced only from the material being tested is to be used.

Compared to the first structural material, the second structural material has a second biodegradability that is different, in particular, lower, than that of the first structural material, that is, after six months or twelve weeks, a second weight percent of the second structural material remains in the 2 mm sieve that is different, in particular, higher, than that of the first structural material. Thus, for example, if 70 wt. % of the first structural material is degraded into particles<2 mm in the composting test within six months, a weight percentage of 60% of the second structural material may be degraded into particles<2 mm in the same period under the same conditions.

The invention thus provides a geomaterial web, which undergoes a material conversion into carbon dioxide in a defined manner by the biological degradation, whereby one of the two structural materials which are included in the geomaterial web or from which the geomaterial web is constructed is biodegraded more rapidly than the other. As a result, both geometric and mechanical properties of the geomaterial web can be specifically influenced by the biodegradation. For example, the faster degradation of the first structural material in the geomaterial web can result in the formation of openings or pores that are advantageous for a rooting process, in that the increased space requirement of the plant roots that occurs with increasing rooting is provided by the biodegradation of the first structural material, but at the same time the mechanical stabilization that is still required is retained by the second structural material. Furthermore, for example, in the case of fabrics or knittings or fleece fabrics or composites material webs made of the first and second structural material, a mechanical property in a first direction in which essentially the first structural material runs in the geomaterial web can be reduced to a greater extent than a mechanical property in a second direction deviating therefrom in which essentially the second structural material runs in the geomaterial web. For example, in an embankment stabilization, stability transverse to the slope direction can be reduced more rapidly than stability in the slope direction, thereby achieving ease of movement of the geomaterial web desired for plant growth, while at the same time preventing slippage in the slope direction. The two structural materials may differ, for example, in that the first structural material is made of a different material than the second structural material or contains a different material than the second structural material. The difference may also be that the material of the first and second structural materials are identical, but the material of the first structural material has undergone a different material treatment than the material of the second structural material. The first and second structural materials preferably do not differ with respect to specific properties such as fiber thickness and/or fiber length.

In principle, in addition to influencing the geometric and mechanical properties by specific arrangement of the first and second structural materials in the geomaterial web, the mechanical properties can also be influenced overall over the degradation period of the geomaterial web by selection and proportion ratios of the first and second structural materials. This advantageously allows the biodegradation rate and reduction of mechanical/geometrical properties to be adapted to local conditions at the installation site of the geomaterial web. While the normalized biodegradability is determined under normalized conditions, different influencing parameters for the biodegradability may prevail at the installation site. For example, an increased oxygen content can lead to faster biodegradation and, vice versa, a reduced oxygen content can lead to slower biodegradation. Furthermore, influencing factors, such as increased UV radiation, a high or low pH value, an increased nutrient supply, an increased proportion of bacteria, an increased proportion of fungi and other factors can influence the rate of biodegradation. As a result of the possibility of changing the mixing ratio of the first and second structural materials in the geomaterial web according to the invention, it is consequently possible, for example, to increase the proportion of the second structural material if an increased rate of biological degradation is to be expected as a result of local influencing factors at the installation site, or vice versa, if influencing factors that reduce the biodegradation rate are to be expected at the installation site, this can be countered by increasing the proportion of the first structural material, in order to obtain in this way a geomaterial web adapted to the local conditions with a tailored biodegradation rate.

Preferably, the first biodegradability is provided to be greater than the second biodegradability. According to this embodiment, the second structural material has a lower biodegradability than the first structural material, that is, the second structural material degrades more slowly than the first structural material. In principle, for example, the first structural material can have a degradability in which at least 90 wt. % of the first structural material is degraded to particles smaller than 2 mm after six months or twelve weeks, whereas for the second structural material this is only 80 wt. % or less. This means that for the first material less than 10 wt. % of the material remains in the 2 mm sieve, whereas for the second material it is more than 20 wt. %. Preferably, the second structural material has a biodegradability in which after six months less than 50% is degraded to particles smaller than 2 mm.

It is further preferred if the first structural material is arranged in the geomaterial web such that, after partial or complete biodegradation of the first structural material, openings penetrating the geomaterial web are formed in the geomaterial web. According to this embodiment, the faster degradation of the first structural material changes the geometric appearance of the geomaterial web by forming openings penetrating the geomaterial web. Accordingly, the first structural material is arranged in the geomaterial web in such a way that it closes these openings in the initial state and, as a result of its degradation, releases these openings or these openings are created. The geomaterial web is thereby perforated or perforated to a greater extent and consequently adapts to a rooting process which, with increasing rooting, on the one hand requires more permeability of the geomaterial web, and on the other hand also requires a lower mechanical strength of the geomaterial web. The desired effect with a formation of openings by degradation of the first structural material can be achieved, for example, by processing the first and second structural material together to form a fleece fabric.

It is further preferred that the first structural material partially or completely penetrates the second structural material. By means of such penetration, on the one hand, a certain directed or undirected mechanical destabilization of the geomaterial web can be achieved by the biodegradation of the first structural material. On the other hand, certain directed or undirected channels and openings in the second structural material can be created by the biodegradation of the first structural material, which runs along the penetration.

It is further preferred that the first structural material and the second structural material are bonded together as a layered composite, the second structural material has a plurality of second perforation openings, and the first structural material has no perforation openings, or has a plurality of first perforation openings that are smaller than the second perforation openings. With such a configuration, it can be achieved that the faster degradation of the first structural material can result in larger openings fully penetrating the geomaterial web.

Another aspect of the invention is a method for location-dependent soil stabilization using a geomaterial web, comprising the steps of:

determining the intensity of an influence parameter at the installation site, wherein the intensity of the influence parameter is selected from:
  an intensity of a radiation effect of an electromagnetic radiation,
  a height of a temperature,
  a concentration of a substance reacting chemically and/or biochemically with the geomaterial web,
  a concentration of a concentration of bacteria, and/or
  a concentration of fungi,
determining one or more of these influencing parameters at a shipment site distant from the installation site,
installing the geomaterial web at the installation site, wherein the geomaterial web comprises a structural material that is
  under the intensity of the influence parameter at the shipment site, exhibits biodegradability to the extent that a residual shipment site fraction remains in a 2 mm sieve within six months when the material or its components are sieved,
  wherein the residual shipment site fraction is less than 30 wt. % of the material,
  under the intensity of the influence parameter at the installation site, exhibits biodegradability to the extent that an installation site residue of the material remains in a 2 mm sieve within six months when the material or its components are sieved,
  where the installation site residue is greater than the residual shipment site fraction.

According to this aspect of the invention, site-dependent soil stabilization is achieved by means of a geomaterial web. This is to be understood as meaning that the geomaterial web has a biodegradation period at the installation site and a biodegradability at the shipment site which differs therefrom and which, as before, can be defined, for example, analogously to the standardization of a degradability according to ISO 16929 or the marine degradation test, but with the parameters determined at the installation site or at the shipment site. According to the conditions prevailing at the installation site, more than 10 wt. %, in particular more than 25 wt. % or more than 80 wt. % of the structural material may remain as particles in a 2 mm sieve after a period of six months or twelve weeks. This results in a reduced biodegradation rate at the installation site, which is sufficient for numerous soil stabilization applications and results in reliable degradation of the geomaterial web. This biodegradability is achieved under the conditions at the installation site, in particular, the mentioned influencing parameters of temperature, radiation exposure, oxygen, bacteria, and/or fungus concentration or the like. In contrast, in the process according to the invention, the material exhibits a higher biodegradability at a shipment site. Thus, under the conditions there, fewer particles of the material remain in a 2 mm sieve after six months or twelve weeks than under the conditions at the installation site. Preferably, less than 80 wt. %, in particular, less than 25 wt. % or less than 10 wt. % of the structural material can be obtained at the shipment site within the six months or twelve weeks in the conditions prevailing there with a higher degradation rate.

The shipment site can be a place where the geomaterial web is transported after removal from the installation site, e.g., deposited, and which differs from the installation site with regard to one of the influencing parameters. For example, at the depositing site, a higher oxygen concentration and/or a stronger UV radiation and/or bacteria and/or fungus concentration produced according to plan may prevail and cause the accelerated biological degradation of the geomaterial web. The shipment site can also be a place to which the geomaterial web arrives completely or in fragments when it is exposed by environmental or other influences, is mechanically attacked, and then, for example, is exposed, floats up, or is displaced by other effects. In this context, a shipment site can also be understood to mean that an original installation of the geomaterial web at the installation site below a soil layer changes in such a way that the soil layer is removed and the geomaterial web is exposed as a result. This is the case, for example, in many marine applications of coastal protection and scour protection, where water and wave action can cause separation and movement of the material from the installation site to a shipment site. At the shipment site, the geomaterial web is degraded at an accelerated rate and thus does not represent a relevant environmental pollution.

It is preferred if the installation site has an environment with a lower temperature and/or a lower oxygen content and/or lower bacteria and/or fungus concentration compared to the shipment site. These influencing parameters are particularly well suited for viscose-based geomaterial webs such as lyocell in order to achieve the different biodegradation rate at the installation site compared to the shipment site.

In particular, the installation site can be on the seabed and the geomaterial web can float up due to flows and/or density differences or reach the surface due to anthropogenic influences. The shipment site is, therefore, characterized by a higher oxygen concentration and temperature in the upper water layers and increased UV irradiation, which accelerates the degradation process.

It is further preferred if the structural material is a viscose-based material, particularly lyocell. Such a structural material has been shown to be particularly suitable for selectively accelerating biodegradation rates at the shipment site compared to the installation site.

According to this aspect of the invention, the geomaterial web is consequently used such that it comprises a structural material that has biodegradability under a first intensity of an influence parameter at an installation site to the extent that in a composting test with the following parameters.

samples with a length of 10 cm, a width of 10 cm and an original material thickness

50° C.+/−5° C.

thermophilic conditions according to ISO 16929, unless these are defined by specific intensities of specific influence parameters at the installation site, sieving of solids after six months in a sieve with 2 mm mesh (mesh 8.75)

when sieving more than 50 dry wt. % of the starting material remains in the sieve, or that in a marine incubation test, with the following parameters:

samples with a length of 2 cm, a width of 2 cm and an original material thickness

30° C.+/−2° C.

aerobic conditions in seawater with a salinity of 3.5 wt. %+/−1 wt. %, unless defined by specific intensities of specific influencing parameters at the installation site, sieving of solids after four, eight, and twelve weeks in a sieve with 2 mm mesh (mesh 8.75)

when sieving, after twelve weeks more than 10 dry wt. %, in particular more than 25 dry wt. % or more than 80 dry wt. % of the starting material remains in the sieve, and under a second intensity of influence parameter at a shipment site exhibits biodegradability to the extent that within six months in the composting test or twelve weeks in the marine incubation test, and less than 80 wt. %, in particular, less than 25 wt. % or less than 10 wt. % of the dry mass of the first structural material remains in the sieve after sieving through a 2 mm sieve, wherein the intensity of the influencing parameter is selected from:

an intensity of a radiation effect of an electromagnetic radiation a height of a temperature, a concentration of a substance reacting chemically and/or biochemically with the geomaterial web, a concentration of bacteria, a concentration of fungi, in such a way that the geomaterial web is installed at the installation site at an installation point in time and is transported to the shipment site at a later point in time following the installation point in time.

According to this use, a geomaterial web is used in such a way that it has a predetermined degradation rate at an installation site that does not exceed a certain biodegradation rate, which is achieved by the above-mentioned influencing parameters prevailing there. In contrast, the geomaterial web is used in such a way that when it is transported from the installation site to a shipment site, which may be by scheduled transport or unscheduled shipment, it has a higher rate of degradation and thus biodegrades at the shipment site at an accelerated rate compared to the installation site. This accelerated degradation is achieved by the dependence of the degradation rate on a different intensity of an influencing parameter there—possibly also by several different influencing parameters prevailing in different intensities at the installation site and at the shipment site—and which are used as influencing parameters instead of the predetermined parameters in the previously defined material tests for composability or for marine degradation.

According to a further aspect of the invention, the above-mentioned object is solved by a geomaterial web comprising a first viscose-based fiber material, in particular lyocell.

According to this aspect of the invention, the geomaterial web comprises a viscose-based fibrous material. This viscose-based fibrous material may be used as a first structural material or second structural material in the geomaterial web. In principle, according to the invention, cellulose regenerated fibers such as lyocell are well suited as a material or component of geomaterial webs.

The geomaterial web may comprise the first viscose-based fibrous material alone or may include other structural materials, in particular, other fibrous materials. In particular, a viscose-based fibrous material may be a fabric made of viscose fibers, that is, in general, a fabric made of chemical fibers of regenerated cellulose. Typically, the cellulose is processed as filament yarn or as staple fiber, for example, by the wet-spinning process. According to the inventors, viscose fibers have proven to be particularly suitable for providing the targeted biodegradation necessary for geomaterial webs. Thus, on the one hand, the viscose fiber can be adapted to a desired rate of biodegradation under predetermined environmental conditions at the installation site by modifying the fiber length, the crimp and by varying finenesses, i.e., fiber thicknesses. Viscose fibers are also metabolizable by numerous living organisms and can therefore be classified as environmentally harmless.

In particular, a viscose-based fibrous material, such as lyocell, may also be used as the first and/or second structural material according to the first aspect of the invention.

In particular, the inventors have identified viscose fibers of the genus lyocell to be suitable. These fibers are a type of viscose fiber produced by a solvent spinning process in which the cellulose is dissolved directly in an organic solvent without forming a derivative and the solution is spun. This manufacturing process, especially when using the organic solvent NMNO (N-methylmorpholine-N-oxide), is environmentally friendly both in terms of production and in terms of the manufactured product. According to the invention, wood pulp can preferably be used as the cellulose feedstock. According to the knowledge of the inventors, lyocell has proven to be biodegradable in typical environmental conditions in soil layers and, in this respect, exhibits a rate of degradation that can interact with rooting rates in new plantings in such a way that, when a degree of rooting sufficient for the mechanical stabilization of an embankment is reached, the degree of biodegradation of the geomaterial web is also sufficiently advanced that rooting is neither significantly impeded nor are appreciable residual quantities of the geomaterial web present in the further course of time. According to the knowledge of the inventors, lyocell also has a good suitability for differentiated biodegradation. For example, lyocell biodegrades more rapidly under elevated ambient oxygen, bacterial and/or fungal concentrations and elevated UV radiation than under low oxygen, bacterial, and/or fungal concentrations and low UV radiation. This allows a geomaterial web to be installed as planned for soil layer stabilization, to provide the mechanical properties required for soil stabilization at this installation site for the desired period of time, but to degrade at an accelerated rate if it is intentionally or unintentionally moved to another site where other conditions, such as increased oxygen, bacterial, and/or fungal concentration or UV irradiation, are then present. This selectivity of degradation rate is advantageous, for example, for use on the seabed with low oxygen, bacterial and fungal concentrations and low temperature and low UV irradiation, as lyocell that is unintentionally floated or moved to locations with different environmental conditions will then degrade at an accelerated rate. Similarly, this can be beneficial in coastal protection and shoreline stabilization activities where lyocell, if exposed, is then degraded at an accelerated rate due to the increased UV radiation and increased concentration of bacterial and/or fungal concentration.

According to a preferred embodiment, the first fiber material is designed as a nonwoven (fleece) or knitted or woven fabric and is processed in the geomaterial web by mechanical bonding, weaving in a grid-like structure, knitting, or weaving to form a textile fabric. This type of bonding of the first fiber material results in a resilient geomaterial web that is well suited for the mechanical loads for soil layer stabilization. At the same time, a favorable degradation behavior with provision of perforations or enlargement of openings as well as a degradation of the mechanical properties is achieved by the way of processing. Here, the first fibrous material can be combined with one or more identical fibrous materials to form a nonwoven fabric or knitted fabric or woven fabric. Furthermore, the first fibrous material can be formed into a nonwoven or knitted or woven fabric with a second fibrous material that is different from the first fibrous material with respect to the material or with respect to the modification of the fibers. In particular, a first structural material and a second structural material can thereby be joined to form a geomaterial web.

According to a further preferred embodiment, it is provided that the first fibrous material is processed with a second fibrous material, which is different from the first fibrous material, to form a textile fabric. Such a textile fabric is formed from two different fibrous materials or more than two different fibrous materials. The textile fabric may be a nonwoven fabric, a knitted fabric, or a woven fabric or a combination thereof.

It is further preferred if the first fibrous material differs from the second fibrous material in having a different fiber thickness, a different chemical nature, a different surface roughness, a different degree of stretching, a different opening or mesh size, or a different tensile strength-elongation behavior, or a different breaking strength, or a combination of two or more of these properties. According to this embodiment, the first and second fibers differ in one or more of seven properties that affect both the mechanical properties and the biodegradation rate of the fibers. By this formation of the textile fabric, it is achieved that the biodegradation rate and the mechanical behavior over the service life of the first fibrous material is different from that of the second fibrous material, which can be achieved both due to a different material nature (chemical nature) and due to a modification of materially matching fibrous materials.

According to the invention, the before-described geomaterial web is used to be incorporated into a soil layer for the purpose of soil stabilization. This soil stabilization, as explained before, can serve for embankment stabilization, bank stabilization, dike stabilization in coastal protection, stabilization of the seabed against scour effects, and stabilization of the soil layer along traffic routes. These applications are characterized by the fact that, on the one hand, biodegradation of the geomaterial web at the installation site itself is advantageous and desirable in order to dissolve the geomaterial web after a certain degree of root penetration or other consolidation of the soil layer has been achieved. On the other hand, in these applications properties of the geomaterial web are desired which lead to the fact that when the geomaterial web is transported from the installation site to another location, for example, due to mechanical decomposition by the wind, floats, or is transported by other flows, it degrades at this other location at an accelerated rate compared to the installation site and/or can be metabolized by flora and fauna compared to conventional products.

Another aspect of the invention relates to the use of a geomaterial web comprising a structural material that is
  under a predetermined intensity of an influencing parameter at an installation site, exhibits biodegradability to the extent that in a composting test with the following parameters:
    samples with a length of 10 cm, a width of 10 cm and an original material thickness
    50° C.+/−5° C.
    thermophilic conditions according to ISO 16929, unless these are defined by specific intensities of specific influence parameters at the installation site,
    sieving of solids after six months in a sieve with 2 mm mesh (mesh 8.75) when sieving, less than 50 dry wt. % of the starting material remains in the sieve, or
in a marine incubation test, with the following parameters:
    samples with a length of 2 cm, a width of 2 cm and an original material thickness
    30° C.+/−2° C.
    aerobic conditions in seawater with a salinity of 3.5 wt. %+/−1 wt. %, unless defined by specific intensities of specific influencing parameters at the installation site,
    sieving of solids after four, eight, and twelve weeks in a sieve with 2 mm mesh (mesh 8.75)
    when sieving, less than 20 dry wt. % of the starting material remains in the sieve after twelve weeks,
wherein the predetermined intensity of the influence parameter is selected from:
    an intensity of a radiation effect of an electromagnetic radiation
    a height of a temperature,
    a concentration of a substance reacting chemically and/or biochemically with the geomaterial web,
    a concentration of bacteria,
    a concentration of fungi,
for stabilizing a soil layer in flood protection or scour protection.

According to this aspect of the invention, a geomaterial web, in particular, a geomaterial web of the type described before, is used to achieve soil stabilization for scour protection or flood protection. Flood protection can be any type of bank stabilization on the seashore, on the banks of flowing and stagnant waters and lakes, whereby the geomaterial web can be arranged in the area below the water surface or above the water surface with respective optional fall dry or wetting. In this case, it serves to stabilize the bed, embankment, or dike and can be used permanently or temporarily during the construction work up to a sufficient degree of root penetration by plants. Scour protection in this context is understood as protection against soil material displacement by flows. Here, too, permanent or temporary protection of the soil can be provided by the geomaterial web. In particular, such scour protection can be achieved, for example, by flexible containers filled with particulate material such as sand or the like, which are made of the geomaterial web, and which are placed on the soil layer to be stabilized.

The geomaterial web is used in such a way that targeted biodegradation is achieved. On the one hand, this targeted biodegradation can consist in the fact that, unlike in the known applications, biodegradability occurs at the installation site itself, and the geomaterial web consequently dissolves as planned within a certain period of time. The biodegradability can also be provided in such a way that the geomaterial web has a higher biodegradability at a shipment site than at the installation site. In this case, it is achieved that when the geomaterial web is intentionally or unintentionally transported away from the installation site, it biodegrades faster at a place of transport with different influencing parameters and consequently does not represent an environmental pollution.

Preferably, it is provided that the geomaterial web is used to produce fillable containers and that these containers are used in such a way that they are placed filled on the seabed, thereby providing scour protection at locations most exposed to flows. With this embodiment, a particularly effective scour protection is achieved.

The use can be further developed by installing the geomaterial web in shore or coastal protection at an installation site with occasional dry fall or at an installation site with occasional wetting, whereby the geomaterial web preferably has a lower density than water. In particular, in the case of occasional dry fall or wetting, unintentional release of a geomaterial web may occur during such fastening operations, and then the special property of biodegradation may be beneficial.

Another aspect of the invention is a method of soil stabilization using a geomaterial web, comprising the steps of: (a) determining a soil parameter value characterizing a soil property at an installation site, (b) determining a degradation value characterizing a biodegradation rate, (c) selecting a mixing ratio of first and second structural materials having different biodegradability based on the soil parameter value and the degradation value, (d) combining the first and second structural materials into a geomaterial web in the mixing ratio, and (e) providing the geomaterial web for installation at the installation site.

According to this aspect of the invention, a soil stabilization is made at an installation site by providing a geomaterial web there to be installed in the soil layer at the installation site. For this purpose, soil properties must be known. This means that at least one property of the soil that influences biodegradability in a relevant way is determined or measured. For example, the moisture content of the soil, the pH value, the nutrient concentration, the presence of bacteria and fungi, and/or the temperature of the soil can be assumed or determined as the average temperature over a daily period, a weekly period, a monthly period, or an annual period. Furthermore, the intensity of UV radiation at the installation site can be measured.

These installation site-specific parameters take into account the influencing parameters on the biodegradation process that prevail at the installation site. From these parameters, a characteristic value can be determined, for example, as a dimensionless factor or as an empirical value from tables. For example, the previously explained compostability or degradation under marine conditions defined according to ISO 16929 can serve as a standard comparison value and the degradation value can be defined in relation to this comparison value, for example, by characterizing a lower percentage degradation property by the soil properties by a corresponding percentage value below 100% or by characterizing a higher biodegradation rate at the installation site by the degradation value by using a value above 100% as the degradation value.

Furthermore, a degradation value is determined, which defines within which period of time a certain degree of biological degradation of the geomaterial web or a component of the geomaterial web should be reached.

Based on the soil parameter value and the degradation value, a mixing ratio of a first to a second structural material is then selected. The first and second structural materials have different biodegradability or degradation rates at the soil parameter value. The mixing ratio may thereby provide an overall achieved biodegradation rate of the geomaterial web constructed from the first and second structural materials. This biodegradation rate depends on the soil parameter value assumed or measured at the installation site and shall be selected to achieve the desired degradation value describing the rate of biodegradation of the geomaterial web.

After selecting the mixing ratio, the first and second structural materials are bonded together to form the geomaterial web. This bonding can take the form of nonwoven, knitted, knitted fabric, or other form and is intended to bond the first and second fibrous materials together in a mechanically resilient way. The geomaterial web produced in this way is consequently tailored for use and targeted biodegradation at the installation site with the conditions prevailing there.

This solution ensures that neither too fast nor too slow biodegradation of the geomaterial web occurs by including the soil parameters influencing biodegradation in the design of the geomaterial web. Here, a specific degradation behavior, characterized by the degradation value, is set by a mixing ratio of two fibrous materials.

The method can be further developed in that the soil parameter value is a soil moisture content of the soil at the installation site, for example, between 3 and 300 wt. %, a soil pH value of the soil at the installation site, for example between 1 and 13, an enzyme concentration in the soil at the installation site, a temperature between 4° C. and 50° C., or a soil parameter value formed from several of these soil parameter values. These soil parameter values are used to determine significant variables influencing the biodegradation rate of typical fibers, such as viscose fibers like lyocell, and can consequently be used to form the geomaterial web with a biodegradability individually designed for the installation site.

Thereby, it is particularly preferred if the degradation value is a strength quotient formed from the ratio of a mechanical strength value to an installation time of the geomaterial web compared to the initial value, a permeability quotient formed from the ratio of a porosity to an installation time of the geomaterial web compared to the initial value, or a degradation characteristic value formed from several of these degradation values. According to this embodiment, the degradation value is defined as either a strength quotient or a permeability quotient, or a degradation characteristic value calculated from the strength quotient and the permeability quotient. Here, the strength quotient characterizes the decrease in mechanical strength of the geomaterial web over a residence time of the geomaterial web in the soil. This strength quotient is formed from the ratio of the mechanical strength value at the time of installation, i.e., when biodegradation has not yet occurred, and the mechanical strength value after a predetermined residence time, which can be normalized to three or six months, for example, and characterizes the mechanical strength after biodegradation has occurred to a certain degree. In an analogous manner, the permeability quotient is determined by setting a porosity at the beginning, i.e., at the time of installation, in relation to a porosity after biodegradation has taken place over a predetermined period of time. By characterizing the degradation values in this way, the desired properties can be specifically determined and consequently influenced by selecting the appropriate material. A strength quotient is in the order of 1.0 to 0 and is typically 0.25, i.e., the strength at a defined point in time is reduced by a factor of four compared with the initial value after biodegradation has taken place. A typical permeability quotient is in the order of one to four powers of ten and is ideally >10, i.e., the permeability at a defined point in time has increased tenfold compared to the initial value after biodegradation has taken place.

The geomaterial web described before, the specific uses described above for it, and the methods for using it can be further formed in that the geomaterial web has a polymer group comprising a molecule provided with an isotope label, in particular, a $^{13}C$ or $^{18}O$ isotope label. According to this embodiment, the geomaterial web is provided with an isotopic label and can, therefore, be unambiguously identified even in a subsequently present, possibly fragmented form. In this way, an occurring environmental pollution can, therefore, be assigned or excluded without any doubt and the cause of such an environmental pollution can be found quickly and reliably.

Furthermore, the method, the use, and the geomaterial web can be further developed in that the geomaterial web comprises a structural material or consists of one or more structural materials that is/are metabolizable. Such metabolization by living organisms, such as mammals, fish, or microorganisms, such as microbes, results in reintegration of the geomaterial web into the biocirculation system and thus environmentally safe disposal. The metabolization can preferably take place on fragments such as shredded fiber residues of the geomaterial web. In this context, metabolization means, on the one hand, biologically harmless compatibility of the geomaterial web for living organisms, and, on the other hand, the ability of the geomaterial web to be chemically modified and degraded under the metabolic processes in the digestive tract of a living organism.

Furthermore, it is preferred if the geomaterial web is formed by a single-layer or multilayer nonwoven filter fabric made of at least two different structural materials bonded together to form a nonwoven fabric, wherein a first structural material under a predetermined intensity of an influence parameter at an installation site exhibits biodegradability to the extent that in a composting test with the following parameters:
samples with a length of 10 cm, a width of 10 cm and an original material thickness
50° C.+/−5° C.
thermophilic conditions according to ISO 16929, unless these are defined by specific intensities of specific influence parameters at the installation site,
sieving of solids after six months in a sieve with 2 mm mesh (mesh 8.75)
when sieving, less than 80 wt. %, in particular less than 25 wt. % or less than 10 wt. % of the dry mass of the first structural material remains in the sieve after twelve weeks, or in a marine incubation test, with the following parameters:
samples with a length of 2 cm, a width of 2 cm and an original material thickness
30° C.+/−2° C.
aerobic conditions in seawater with a salinity of 3.5 wt. %+/−1 wt. %, unless defined by specific intensities of specific influencing parameters at the installation site,
sieving of solids after four, eight, and twelve weeks in a sieve with 2 mm mesh (mesh 8.75)
when sieving, less than 80% by weight, in particular less than 25 wt. % or less than 10% by weight, of the dry mass of the first structural material remains in the sieve after twelve weeks, wherein the predetermined intensity of the influence parameter is selected from:

an intensity of a radiation effect of an electromagnetic radiation a height of a temperature, a concentration of a substance reacting chemically and/or biochemically with the geomaterial web, a concentration of bacteria, a concentration of fungi, and a second structural material is bonded to the first structural material to form the nonwoven filter fabric, the second structural material having a lower biodegradability under the same predetermined intensity of the influencing parameter at the same installation site to the extent that within six months under the same conditions a greater weight percent of the dry matter of the second structural material remains in the sieve after six months or twelve weeks, respectively, when sieving through a 2 mm sieve than with the first structural material. According to this embodiment, the geomaterial web is formed as a nonwoven fabric consisting of two different structural materials that have different biodegradation rates under the given, predetermined parameters. As a result, the nonwoven material can undergo a targeted mechanical structural weakening due to the biodegradation process on the one hand, and a geometric change with pore formation, perforation formation, or the like on the other hand, in order to promote a root penetration process, for example.

A further embodiment provides that the geomaterial web, the method for its manufacture, or its installation and its use are developed in such a way that the geomaterial web is installed as an element in structures which serve to influence air flows in such a way that, in particular, the speed of the air flow is locally reduced for the purpose of depositing particles which are transported suspended in the air, bounce or roll when the air speed is not reduced. The geomaterial web, the use, and the method thus serve the deposition of mineral materials, in particular, sand, at, e.g., coastal sections which are endangered by sand erosion. The reduction of the air velocity thus leads to the deposition of sand, preferably in the lee of the constructions. The construction is thereby partially or completely sanded in. The geomaterial web according to the invention thus becomes a component of the sand deposit, and can be removed according to the invention as far as the construction is within the sand deposit or, if the construction is exposed again by a change in the erosion conditions, it can be removed according to the invention at the installation site or shipment site.

BRIEF DESCRIPTION OF THE DRAWINGS

Preferred embodiments are explained with reference to the figures. They show:

FIG. 5 is a schematic representation of a third embodiment of the geomaterial web according to the invention; and FIG. 6 is a schematic representation of a fourth embodiment of the geomaterial web according to the invention.

DETAILED DESCRIPTION OF THE EMBODIMENTS

Figure 1:
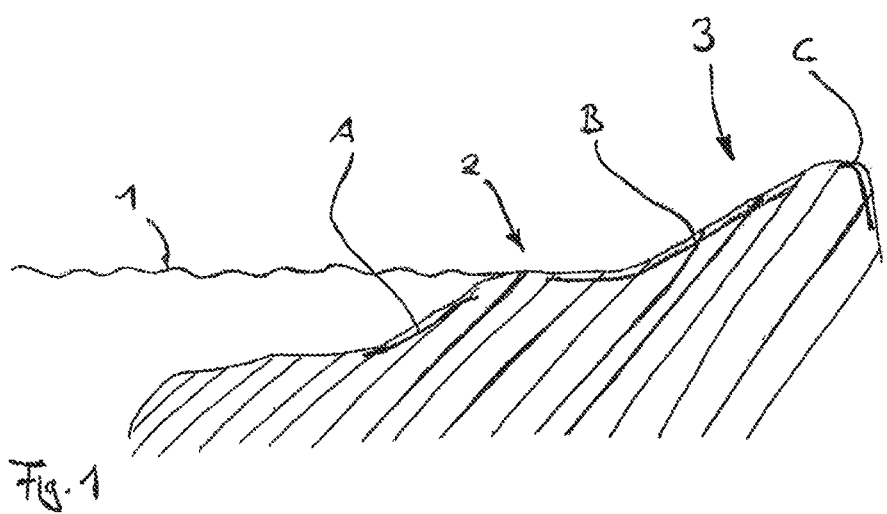
FIG. 1 is a schematic illustration of a use of the geomaterial web according to the invention in three different arrangements for coastal protection.

The geomaterial web according to the invention can basically be installed in three different installation situations with respect to a water contact in the bank area. Starting from a natural shore area 2, which is bordered by the waterline or, in the case of tidal waters, by the average water level, and which may be protected against high water situations by an artificial dike 3, a geomaterial web can initially be used in an installation position A in order to stabilize the underwater terrain of the natural seabed course, in which stabilization of the soil with plants is only insufficiently possible. In this installation position A, the geomaterial web is usually submerged and can dry out in exceptional cases during low tide or strong waves.

In a second installation position B, the geomaterial web is installed on the water side to stabilize the natural embankment and/or to stabilize the artificial embankment. In this installation position, the geomaterial web stabilizes the usually dry bank portion of the natural embankment and, where appropriate, the artificial embankment of the dike. It is, therefore, generally dry, but may also be immersed in flood situations or in the event of strong waves.

In a third installation position C, the geomaterial web is used in an area, such as the back of the dike, in which it is not exposed to the water itself and can only be subjected to stress in special situations such as an overflow. In this installation position, the geomaterial web is therefore always dry and, as in any installation position, is only exposed to wetting by rainfall.

Each of the three installation positions requires differently adjusted behavior of geomaterial webs in order to achieve ecologically favorable behavior. Thus, in installation position A, stability of the geomaterial web in the aqueous environment is required, but if, due to abrasive events, parts of this geomaterial web become detached and are, therefore, no longer in the place required to fulfill their function, degradation of these detached geomaterial web components is desired. According to the invention, this can be achieved, for example, by forming the geomaterial web from a material that is rapidly degraded under the influence of UV radiation. In this way, it is possible to ensure that torn parts of the geomaterial web that float up or are washed ashore are subjected to rapid degradation, whereas at the installation site, when the geomaterial web is not exposed to UV radiation, mechanical stability is maintained. Instead of specifying the geomaterial web to UV radiation, it is also possible, for example, to specify biodegradability as a function of the oxygen content of the water and/or the bacterial concentration and/or the fungal concentration in certain applications. This is particularly suitable when geomaterial webs are used at great ocean depths where, in particular, low concentrations of the aforementioned influencing parameters prevail. In this case, the material of the geomaterial web can be designed to be mechanically stable in the planned installation situation and in the surrounding water and to biodegrade as soon as the concentration of influencing parameters is increased in the surrounding water or at the shipment site.

Figures 2A, 2B:
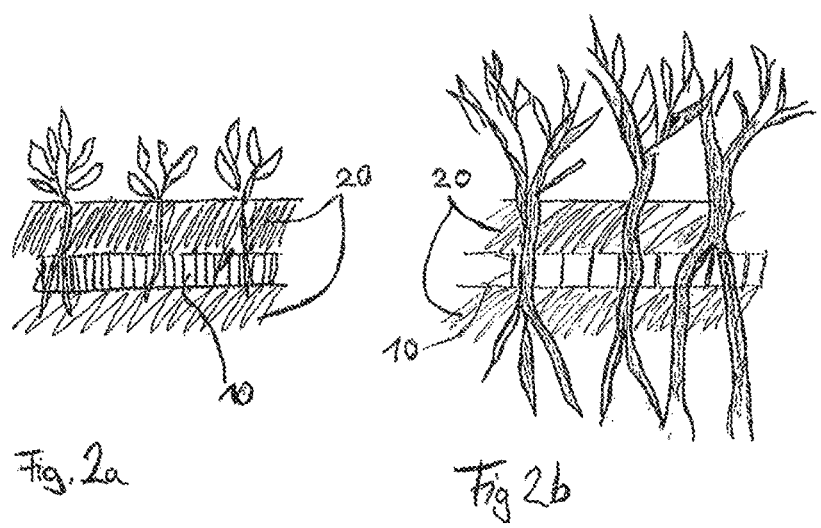
FIGS. 2a and 2b are uses of the geomaterial web according to the invention for embankment stabilization at two different rooting times.

The installation situation according to C is relevant for the invention, for example, with regard to rooting and adaptation of the geomaterial web to rooting processes. FIGS. 2*a* and *b* show two successive rooting situations in which a geomaterial web 10 is installed to stabilize a soil layer 20 at a certain depth of the soil. As can be seen from FIG. 2*a*, the geomaterial web 10 has a high density with only small openings at an early stage, shortly after soil-stabilizing plants have been set, thereby providing a high degree of mechanical stabilization of the soil. The planted plants can penetrate the geomaterial web with small suckers and are not hindered in their growth. An effective mechanical bond between the geomaterial web and the plants is already achieved at this early stage.

FIG. 2*b* shows the same installation situation after a few weeks of plant growth. The geomaterial web has partially decomposed mechanically due to biodegradation. It has larger openings and less mechanical stability. Due to the larger openings, the growing plants are not hindered in their rooting and the increase of the root diameters and can, therefore, take over the mechanical stabilization function. Therefore, with the geomaterial web according to the invention, a continuous shift of the mechanical stability of the soil layer from the geomaterial web to the plants is achieved, while maintaining a good mechanical connection between the plants and the geomaterial web, and the geomaterial web continues to have mechanical properties, possibly different in direction, and to assume functions for stabilizing the soil.

FIGS. 3 to 6 show exemplary embodiments of a geomaterial web. In principle, the geomaterial webs according to the invention can be provided in different widths and lengths. Typical widths are greater than 1 m, 1.5 m, or 2 m and smaller than 4 m, 5 m, or 6 m and typical lengths are longer than 2 m, 5 m, 10 m, 50 m, whereby the geomaterial web is preferably transportable in rolled condition and is unrolled during installation. The thickness of the geomaterial web can be greater than 1 mm, thicknesses of more than 5 mm, 10 mm, or more than 20 mm are preferred. The geomaterial web may have a basis weight greater than 150, greater than 300, or greater than 500 g/m². The basis weight may be less than 1500, less than 2000 g/m², or less than 2500 g/m².

Figure 3:
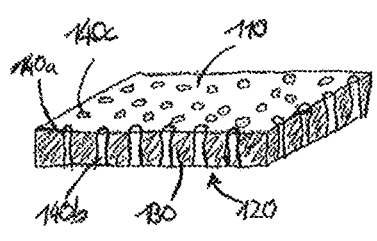
FIG. 3 is a schematic representation of a first embodiment of the geomaterial web according to the invention.

FIG. 3 shows a first embodiment with a top layer 110, a carrier layer 120, and a middle layer 130 arranged between the top layer 110 and the carrier layer 120. The top and carrier layers 110 and 120 may be made of different or the same materials and the middle layer 130 may be formed to the same way as the top layer and carrier layer or may be made of a material that is different therefrom.

The top layer 110 and the carrier layer 120 are connected to each other by means of needling or sewing or knitting, for which purpose several needles 140*a*, 140*b*, 140*c* are introduced into the geomaterial web, which connect the top layer 110 to the carrier layer 120 through the intermediate/middle layer 130. In this embodiment of a geomaterial web, the top layer 110 can, for example, be made of a material that biodegrades more quickly than the carrier layer 120. As a result, after partial or complete biodegradation of the needling or sewing or knitting portions of the geomaterial web, channels are formed that extend from the top to the bottom of the geomaterial web and, for example, provide space for root penetration or drainage effects. Thus, by said needling, the top layer material 110 and the carrier layer material 120 penetrate in said regions 140*a,b,c* through said intermediate/middle layer 130.

Figure 4:
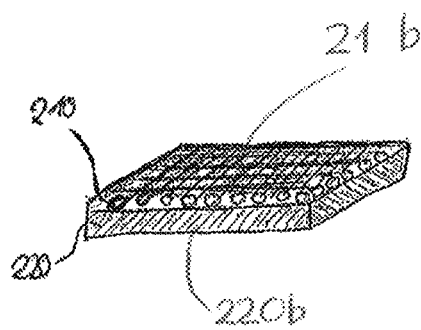
FIG. 4 is a schematic representation of a second embodiment of the geomaterial web according to the invention.

FIG. 4 shows a second embodiment of a geomaterial web comprising an upper grid layer 210 and an underlying nonwoven layer 220. The grid layer 210 is formed by a crisscrossed grid of strong individual fibers or rods forming grid openings of a certain size, for example, 10×10 mm to 40×40 mm. The nonwoven layer is formed of dense, randomly oriented fibers of a different material to the layer 210. This nonwoven layer has the overall effect of closing the openings of the grid layer 210, resulting in an overall geomaterial web that is impermeable to coarser particles and has permeability to liquids and gases. The nonwoven layer 220 is made of a material such as lyocell and biodegrades faster than the grid layer 210. This reduces the mechanical strength of the geomaterial web within the short biodegradation time of the nonwoven layer 220 and, after degradation of the nonwoven layer 220, the geomaterial web is reduced to the remaining grid layer 210 with the openings formed therein, which, in turn, provide appropriate space for favorable root penetration. First perforation openings, namely the grid openings 210*b* in the grid layer 210 and a plurality of second perforation openings 220*b* in the second material, namely the nonwoven layer 220 are shown, with said first perforation openings being smaller than said second perforation openings.

FIG. 5 shows a third embodiment, which is basically designed as a single-layer geomaterial web. In the geomaterial web, fibers 310 of a first material are arranged in a first direction and fibers 320 are arranged in a second direction transverse to the first direction, thereby forming respective fiber layers. The fibers 310 and 320 may be bonded together, for example, by welding, bonding, by looping, needling, weaving techniques, or knitting techniques, and/or by means of a cover and backing layer above and below the fibers 310 and 320. The fibers 310 are made of a different material than the fibers 320, and the material from which the fibers 320 are formed biodegrades more rapidly than the material from which the fibers 310 are formed. Due to this biodegradation behavior of the geomaterial web, the geomaterial web initially exhibits load capacity in the longitudinal and transverse directions corresponding to the course of the fibers 310, 320. As the biodegradation of the fibers 320 increases, the strength and load capacity in the longitudinal direction along the course of the fibers 320 decreases, resulting in an anisotropic mechanical load behavior of the geomaterial web.

FIG. 6 shows a fourth embodiment in which two different materials are processed into a nonwoven layer that represents a geomaterial web or may represent a layer of a geomaterial web. The two different materials 410, 420 are processed unoriented as short or long fibers or continuous fibers to form a nonwoven web and are bonded together. The material 420 biodegrades faster than the material 410, causing the density of the geomaterial web to decrease as the biodegradation increases in the installation situation and causing the geomaterial web to become more permeable and/or change its mechanical properties.

In principle, it is to be understood that the four embodiment examples may also be combined with each other by producing multi-layer geomaterial webs therefrom having combined properties of these embodiments. Furthermore, it is to be understood that the combination of the four embodiments can also be done in such a way that their properties are combined in a single layered geomaterial web, for example, by forming the lattice structure 210 of the second embodiment with the anisotropic biodegrading fibers 310, 320 of the third embodiment.

The biodegradation behavior can basically be adjusted at the installation site and adapted to the conditions prevailing there. Thus, in all embodiments, the proportion of one material can be increased or decreased in relation to the proportion of the other material in order to obtain a desired biodegradation behavior in adaptation to the prevailing conditions. Furthermore, the biodegradation properties can be influenced or even first triggered by external influences, such as UV radiation and/or oxygen content and/or concentration of bacteria, fungi, or chemical influences of the environment, resulting in a specific behavior of the geomaterial webs with respect to biodegradation when they are moved from one location to another location where these specific environmental conditions change.

The invention claimed is:

1. A geomaterial web, comprising:
a first organic structural material and a second structural material that is different from the first structural material and that is bonded to the first structural material to form a sheet-like composite material web extending in two mutually perpendicular directions;
wherein the first structural material and the second structural material are organic, fibrous non-woven materials;
wherein the first structural material is a plastic material, and wherein:
the first and the second structural material have a first and a second biodegradability, respectively, to the extent that:
in a composting test with the following parameters:
samples with a length of 10 cm, a width of 10 cm and an original material thickness,
50° C.+/−5° C.,
thermophilic conditions according to ISO 16929: 2018-04 (modified only according to the temperature range set forth above),
sieving of solids after six months in a sieve with 2 mm mesh (mesh 8.75), and
when sieving, less than 80 wt. % dry matter of the an initial dry matter of the starting material remains in the sieve; or
in a marine incubation test with the following parameters:
samples with a length of 2 cm, a width of 2 cm and an original material thickness,
30° C.+/−2° C.,
aerobic conditions in seawater with a salinity of 3.5 wt. %+/−1 wt. %,
sieving of solids after twelve weeks in a sieve with 2 mm mesh (mesh 8.75), and
when sieving after twelve weeks, less than 80 wt. % dry matter of a dry matter of the starting material remains in the sieve; and
the second structural material has a second biodegradability which is different from the first biodegradability.

2. The geomaterial web according to claim 1, wherein the second biodegradability is lower than the first biodegradability.

3. The geomaterial web according to claim 1, wherein the first structural material is arranged in the geomaterial web in such a way that, after partial or complete biological degradation of the first structural material, openings are formed in the geomaterial web passing through the geomaterial web.

4. The geomaterial web according to claim 3, wherein the first structural material partially or completely penetrates the second structural material; or
wherein the first structural material and the second structural material core bonded together as a layered composite, the second structural material has a plurality of second perforation openings, and the first structural material has no perforation openings, or has a plurality of first perforation openings that are smaller than the second perforation openings.

5. A method of using a geomaterial web according to claim 1, wherein the geomaterial web is incorporated into a soil layer for the purpose of soil stabilization.

6. The geomaterial web of claim 1, wherein;
the geomaterial web has a polymer group comprising a molecule provided with an isotopic label comprising a $^{13}C$ or $^{18}O$-isotopic label; or
the geomaterial web comprises said first and second structural materials that are biodegradable.

7. The geomaterial web of claim 1, wherein the geomaterial web is formed by a single-layer or multilayer nonwoven filter fabric made of at least said first and second structural materials bonded together to form a nonwoven fabric, wherein:
the first and second structural materials are fibrous nonwoven materials and the first structural material is a plastic material,
the first structural material exhibits biodegradability under a predetermined intensity of an influencing parameter at an installation site to the extent that a weight percentage of more than 50% of the structural material is converted to carbon dioxide within six months in an aqueous medium, wherein the predetermined intensity of the influencing parameter is selected from:
an intensity of a radiation effect of an electromagnetic radiation;
a height of a temperature;
a concentration of a substance reacting chemically or biochemically with the geomaterial web;
a concentration of bacteria; or
a concentration of fungi;
and the second structural material is bonded to the first structural material to form the nonwoven filter fabric, the second structural material having biodegradability under the same predetermined intensity of influencing parameter at the same installation site to the extent that:
in a composting test with the following parameters:
samples with a length of 10 cm, a width of 10 cm and an original material thickness,
50° C.+/−5° C.,
thermophilic conditions according to ISO 16929:2018-04 (modified only according to the temperature range set forth above),
sieving of solids after six months in a sieve with 2 mm ash width (mesh 8.75), and
when sieving less than 50 dry wt. % of the starting material remains in the sieve; or
in a marine incubation test, with the following parameters:
samples with a length of 2 cm, a width of 2 cm and an original material thickness,
30° C.+/−2° C.,
aerobic conditions in seawater with a salinity of 3.5 wt. %+/−1 wt. %,
sieving of solids after twelve weeks in a sieve with 2 mm mesh (mesh 8.75), and
when sieving after twelve weeks, less than 20 dry wt. % of the starting material remains in the sieve.

8. The geomaterial web according to claim 7, wherein the second structural material is a wood-based material.

9. The geomaterial web according to claim 7, wherein the second structural material is a wood-based, viscose-based fibrous material.

10. The geomaterial web according to claim 9, wherein the second structural material is lyocell.

11. The geomaterial web according to claim 1, wherein the second structural material is a wood-based material.

12. The geomaterial web according to claim 1, wherein the second structural material is a wood-based, viscose-based fibrous material.

13. The geomaterial web according to claim 12, wherein the second structural material is lyocell.

\* \* \* \* \*